US011721257B2

(12) United States Patent
Son

(10) Patent No.: US 11,721,257 B2
(45) Date of Patent: Aug. 8, 2023

(54) IMAGE DISPLAY DEVICE AND MOTION DETECTION METHOD OF IMAGE DISPLAY DEVICE

(71) Applicant: LG ELECTRONICS INC., Seoul (KR)

(72) Inventor: Ji Han Son, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/942,993

(22) Filed: Sep. 12, 2022

(65) Prior Publication Data
US 2023/0005403 A1 Jan. 5, 2023

Related U.S. Application Data

(62) Division of application No. 16/929,851, filed on Jul. 15, 2020, now Pat. No. 11,587,483.

(51) Int. Cl.
G09G 3/00 (2006.01)
G06T 7/246 (2017.01)

(52) U.S. Cl.
CPC ............ G09G 3/035 (2020.08); G06T 7/248 (2017.01); G06T 2207/20021 (2013.01);
(Continued)

(58) Field of Classification Search
CPC ............................. G06F 1/1652; G09G 3/035
See application file for complete search history.

(56) References Cited

U.S. PATENT DOCUMENTS

2001/0015409 A1* 8/2001 Mahler ............ G08B 13/19697
340/567
2015/0220118 A1 8/2015 Kwak et al.
(Continued)

FOREIGN PATENT DOCUMENTS

| KR | 101570869 | 11/2015 |
| KR | 1020160098677 | 8/2016 |
| KR | 1020170123382 | 11/2017 |

OTHER PUBLICATIONS

PCT International Application No. PCT/KR2019/008988, Written Opinion of the International Searching Authority dated Apr. 17, 2020, 6 pages.
(Continued)

Primary Examiner — Kevin M Nguyen
(74) Attorney, Agent, or Firm — Lee, Hong, Degerman, Kang & Waimey PC

(57) ABSTRACT

Disclosed are an image display device and a method of controlling an image display device. The image display device includes a motion detection unit for detecting a motion of a user and provides a welcome feedback to the user in the form of a visual signal, an audio signal, or both according to whether the motion of the user is detected or not, thereby drawing attention of the user or switching a display state to reduce power consumption of the image display device. The image display device determines a motion exception event that is not regarded a user motion on the basis of an overall change or a local change in pixel value between image frames, thereby preventing the display panel from being activated by a non-human-related factor such as a sudden change in illuminance or a movement of a periodically operating object.

20 Claims, 11 Drawing Sheets

(52) U.S. Cl.
CPC ... *G09G 2330/022* (2013.01); *G09G 2354/00* (2013.01); *G09G 2360/144* (2013.01); *G09G 2380/02* (2013.01)

(56) References Cited

U.S. PATENT DOCUMENTS

| | | |
|---|---|---|
| 2016/0320804 A1 | 11/2016 | Takayanagi et al. |
| 2017/0140504 A1* | 5/2017 | Jeong .................... G06F 1/1677 |
| 2018/0279490 A1 | 9/2018 | Cope et al. |
| 2020/0329572 A1 | 10/2020 | Wittenberg et al. |
| 2021/0020088 A1 | 1/2021 | Son |

OTHER PUBLICATIONS

United States Patent and Trademark Office U.S. Appl. No. 16/929,851, Office Action dated Dec. 29, 2021, 14 pages.

* cited by examiner

IMAGE DISPLAY DEVICE AND MOTION DETECTION METHOD OF IMAGE DISPLAY DEVICE

CROSS-REFERENCE TO RELATED APPLICATIONS

This application is a divisional of U.S. patent application Ser. No. 16/929,851, filed on Jul. 15, 2020, which claims the benefit of an earlier filing date and right of priority to International Application No. PCT/KR2019/008988, filed on Jul. 19, 2019, the contents of which are all hereby incorporated by reference herein their entirety.

TECHNICAL FIELD

The present invention relates to an image display device and a method of controlling the image display device. More particularly, the present invention relates to an image display device having a motion detection function and to a method of controlling the image display device.

BACKGROUND ART

In general, an image display device displays an image on a display module, such as a cathode ray tube, a liquid crystal panel, an electroluminescent panel, a light emitting diode panel, a plasma display panel, and the like.

Recently, image display devices have become larger and more advanced in functionality. With this trend, the sizes of display panels of image display devices have been increased. However, the larger and advanced display devices have a problem in that power consumption increases with the size of the display panel.

To solve this problem, technology development has been focused on enhancing the performance of a power saving function. However, there is a limit in power saving because the size of the display in a display device is not variable. For this reason, quite recently, an image display device in which a display size is variable according to settings has been proposed and has attracted great attention as a next generation image display device.

On the other hand, there is a conventional power saving technique in which an image display device is equipped with a camera module to detect a motion of a user in front of the image display device. The image display device switches to a power saving mode when there is no user motion detected. However, the conventional technique has a problem in that a sudden change in ambient illuminance or a movement of a periodically moving object is erroneously detected as a motion of a user, resulting in an unexpected activation of the image display device.

DISCLOSURE

Technical Problem

An objective of the present invention is to provide an image display device that detects a motion of a user and outputs at least one of light (i.e., visual signal) and sound (i.e., audio signal) as welcome feedback. Another objective of the present invention is to provide an image display device capable of detecting a motion of a user and switching a display panel from a partial view state to a zero view state. A further objective of the present invention is to provide a motion detection method for an image display device, the method being capable of preventing a sudden change in illuminance or a movement of a periodically moving object which is not a human being from being recognized as a motion of a user, thereby preventing erroneous detection of a user motion, which contributes to power saving.

Technical Solution

In order to solve the above problems, according to one exemplary embodiment of the present invention, there is provided an image display device equipped with a motion detection unit for detecting a motion of a user. When a user motion is detected by the motion detection unit with a display panel being in a zero-view state, a light emitting unit and/or an audio output unit is controlled to output light and/or sound as their welcome feedback signal.

In order to solve the above problems, according to one exemplary embodiment of the present invention, there is provided an image display device equipped with a motion detection unit for detecting a motion of a user. When the motion of a user is not detected by the motion detection unit for a predetermined period of time while a display panel is in a partial view state, the display panel is switched from the partial view state to a zero-view state.

In order to solve the problems occurring in the related art, according to one exemplary embodiment of the present invention, there is provided a motion detection method of an image display device. The method includes a motion exclusion process of determining whether it is a motion exclusion condition on the basis of an overall change, a local change, or both in pixel brightness value between two temporally adjacent frames each being composed of a plurality of blocks, thereby preventing erroneous detection in detecting a motion of a user.

Advantageous Effects

As described above, the image display device according to the present invention can draw user's attention by outputting light, sound, or both as welcome feedback after detecting a user motion. In addition, the image display device according to the present invention can save power and maximize space utilization by detecting a motion of a user and switching a display panel from a partial view state to a zero view state when no user motion is detected. In addition, the motion detection method of the image display device according to the present invention can prevent erroneous user motion detection by preventing a sudden change in illuminance or a movement of a periodically moving object from being recognized as a user motion.

BEST MODE

Hereinafter, specific embodiments of the present disclosure will be described in detail with reference to the accompanying drawings.

The advantages and features of the present invention and the manner of achieving them will become apparent with reference to the embodiments described in detail below and the accompanying drawings. The present invention may, however, be embodied in many different forms and should not be construed as being limited to the embodiments set forth herein. Rather, these embodiments are provided so that the present invention will be thorough and complete and will fully convey the concept of the invention to those skilled in the art. Thus, the present invention will be defined only by the scope of the appended claims. Like numbers refer to like elements throughout the following description herein.

Figure 1:
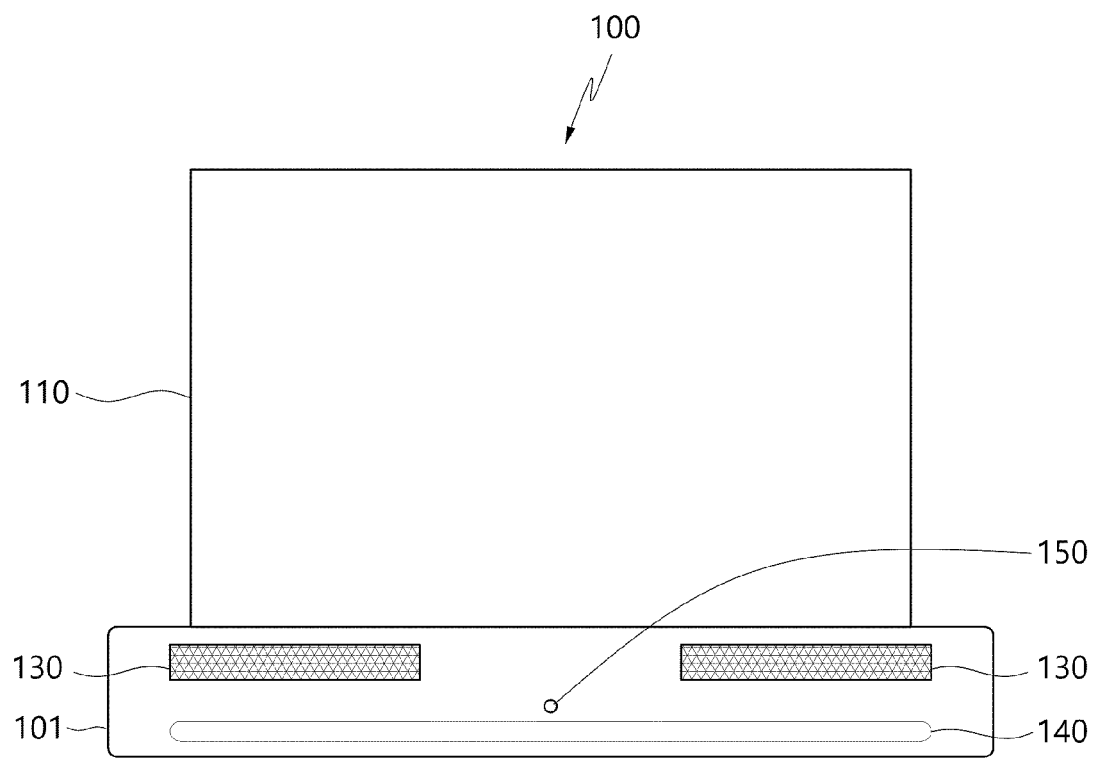
FIGS. 1 and 2 are schematic views illustrating an image display device 100 according to one exemplary embodiment of the present invention.
Figure 2:
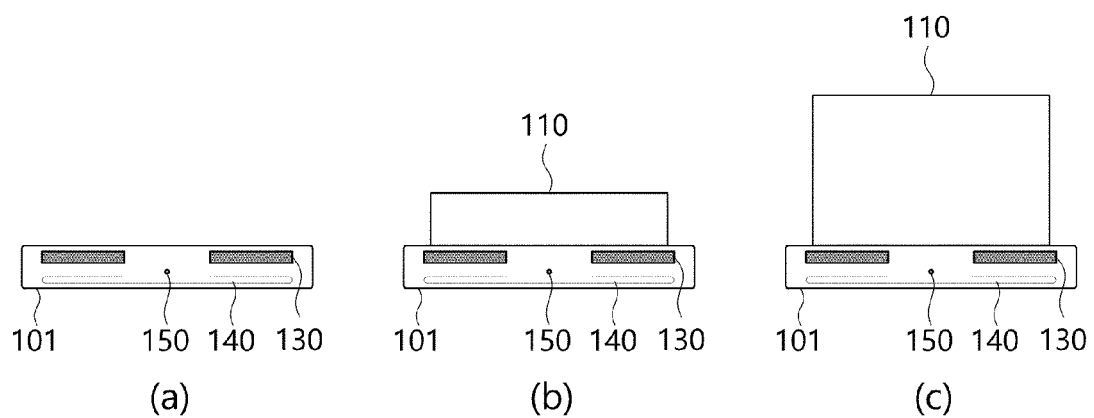
Figure 3:
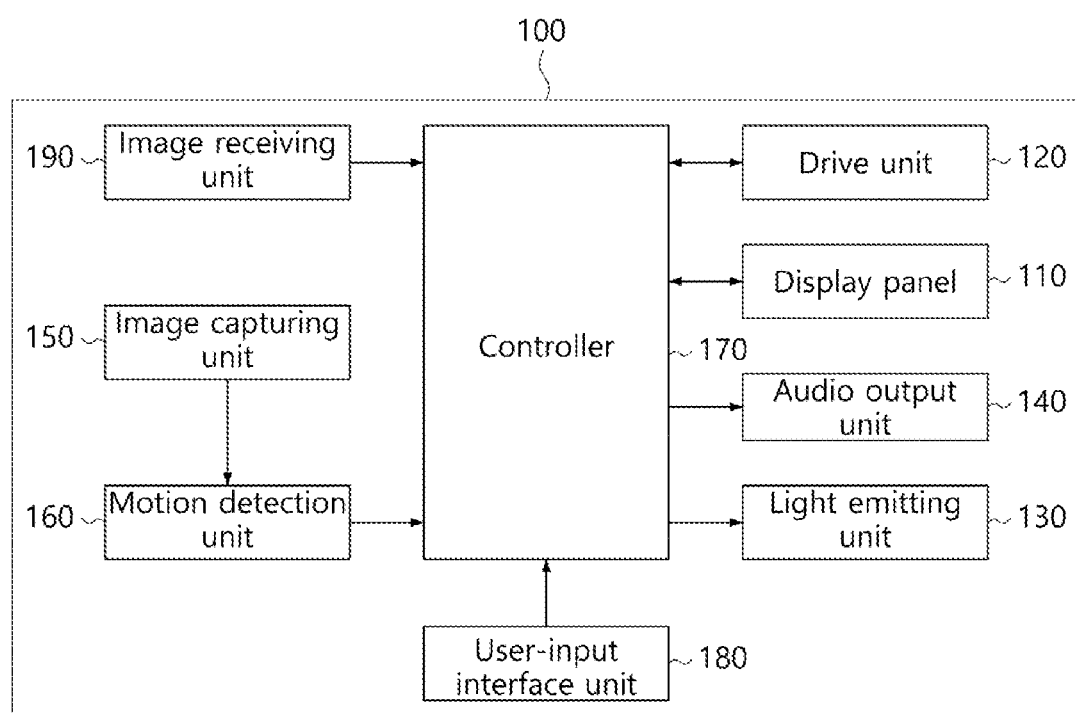
FIG. 3 is a block diagram of the image display device 100 according to one exemplary embodiment of the present invention.

FIGS. 1 and 2 are schematic views illustrating an image display device 100 according to one exemplary embodiment of the present invention, and FIG. 3 is a block diagram of the image display device 100 according to one exemplary embodiment of the present invention.

Referring to FIGS. 1 to 3, the image display device 100 according to one exemplary embodiment of the present invention includes a rollable display panel 110, a drive unit 120, a housing 101, a motion detection unit 160, and a controller 170.

The display panel 110 is a flexible display panel 110 that is variable in size. That is, the display panel 110 may be accommodated in the housing 101 when it is fully rolled down and may be stretched out of the housing when rolled up. The display panel 110 is, for example, an organic light emitting diode (OLED) panel.

The drive unit 120 functions to roll up and roll down the display panel 110. The drive unit 120 may include a roller (not shown) around which the display panel 110 is to be wound and a motor (not shown) which rotates the roller.

FIG. 2 illustrates an example in which the size of the display panel 110 is changed through operation of the drive unit 120. FIG. 2A illustrates a zero view state in which the display panel 110 is fully rolled down, and FIG. 2B illustrates a partial view state in which the display panel 110 is partially rolled up. FIG. 2C illustrates a full view state in which the display panel 110 is entirely rolled up such that the entire display panel 110 is fully stretched out of the housing. The image display device 100 according to the present invention may offer various functionalities according to changes in the size of the display panel 110. In FIG. 2, one partial view state is illustrated. The image display device 100 may have a plurality of partial view states which differ in the height of the display panel 110 according to how much degree the display panel 110 is rolled up.

The housing 101 has an internal space for accommodating the display panel 110 when the display panel 110 is rolled down. The drive unit 120, the motion detection unit 160, and the controller 170 may installed in the internal space of the housing 101. The housing 101 is provided with a slit (not shown) through which the display panel 110 can be rolled into and rolled out of the housing. The housing 101 may be implemented in any shape and size if the shape and size allow the display panel 110 to be received in the housing 101. FIG. 1 illustrates an example in which the housing is implemented in the form of a rectangular shape.

The housing 101 is provided with a light emitting unit 130, an audio output unit 140 and an image capturing unit 150, each of which may be disposed on the front surface of the housing 101 or on an arbitrary position while facing forward.

The light emitting unit 130 is a device for emitting light and may be configured with light emitting devices such as light emitting diodes (LEDs). The light emitting unit 130 may be configured such that a plurality of light emitting devices is arranged to form predetermined patterns. For example, in FIG. 1, the light emitting unit 130 is configured such that the light emitting devices are linearly arranged. The light emitting unit 130 is one of the output means for providing a welcome feedback signal. The welcome feedback refers to visual feedback or audio feedback provided to a user when the image display device 100 detects a motion of a user while the image display device 100 is in the zero view state. The controller 170, which will be described later, may provide visual feedback with various colors or patterns by controlling toggles or color changes of the light emitting devices of the light emitting unit 130 when a motion of a user is detected. The light emitting unit 130 is disposed toward the front side of the housing 101 so that a user in front of the image display device 100 can easily recognize the welcome feedback. In FIG. 1, the light emitting unit 130 is integrally formed with the front surface of the housing 101. However, the arrangement of the light emitting unit 130 is not limited thereto. That is, the light emitting unit 130 can be disposed at any place if it can face forward so that a user can easily recognize the welcome feedback. For example, the light emitting unit 130 can be disposed on the upper surface or the side surface of the housing 101.

The audio output unit 140 may include a speaker module to output a sound signal. The audio output unit 140 is one of the output means for providing the welcome feedback in the form of sound. The controller 170 to be described later in detail may perform output an audio signal (i.e., sound) corresponding to welcome feedback to the audio output unit 140 when a motion of a user is detected. In this case, the welcome feedback is provided through the audio output unit 140. In FIG. 1, the audio output unit 140 is integrally formed on the front surface of the housing 101. However, the arrangement of the audio output unit 140 is not limited thereto. For example, the audio output unit 140 can be disposed on the upper surface or the side surface of the housing 101 if sound (i.e., audio signal) can be output toward the front side of the image display device 100.

The image capturing unit 150 is a device for capturing an image of an object exterior to the image display device 100. The image capturing unit 150 includes an image sensor such as a CCD or a CMOS. The image capturing unit 150 may be disposed on the front surface of the housing 101 or disposed to face forward. FIG. 1 illustrates an arrangement example in which the image capturing unit 150 is fixed to the center portion of the front surface of the housing 101. The image capturing unit 150 is a means for imaging an object in front of the image display device 100 to detect a motion of a user. Therefore, the image capturing unit 150 can be disposed on the upper surface or the side surface of the housing 101 instead of the front surface if it can capture an image of an object existing in front of the image display device 100.

The motion detection unit 160 detects a motion of a user by analyzing two temporally adjacent frames (i.e., a temporally front frame and a temporally rear frame) captured by the image capturing unit 150. The motion detector 160 includes an algorithm to process input frames and detect a motion of a user and a processor for executing the algorithm.

The controller 170 controls the light emitting unit 130, the audio output unit 140, and the drive unit 120 according to the results of a motion detection performed by the motion detector 160. The controller 170 includes a control algorithm, a processor for executing the control algorithm, and a memory in which the control algorithm is stored.

When the display panel 110 is in the zero view state, the controller 170 activates the image capturing unit 150 and the motion detection unit 160 to detect whether there is a motion of a user. When a motion of a user is detected by the motion detection unit 160, at least one of the light emitting unit 130 and the audio output unit 140 is activated to provide a welcome feedback in the form of light or sound. As such, when a motion of a user is detected in the zero-view state of the display panel 110, the image display device 100 draw a user's attention by sending a welcome message (i.e., welcome feedback). The above-described welcome feedback may be provided only when a welcome feedback function is set to ON state.

The welcome feedback may be provided in various ways. For example, the controller 170 may output various forms of welcome feedback by controlling emission colors, brightness, toggles, dimming, etc. of the plurality of light emitting devices of the light emitting unit 130. In addition, the controller 170 may have a plurality of welcome feedbacks. The controller 170 may allow the audio output unit 140 to output a welcome feedback in various forms such as music, specific sound, and human voice.

In the present embodiment, there are two welcome feedback modes. For example, in one welcome feedback mode (first mode), in a case where a device that is listed in a device connection history record of the image display device 100 is detected when a user application program such as Smart-TinkQ is executed, when a motion of a user is detected, the controller 170 performs control such that both a visual feedback and an audio feedback are provided to the user through the light emitting unit 130 and the audio output unit 140, respectively. In the other welcome feedback mode (second mode), in a case where a device that is listed in the device connection history record of the image display device 100 is not detected when a user application program such as SmartTinkQ is executed, the controller 170 performs control such that only a visual feedback is provided to the user through the light emitting unit 130. That is, in the present embodiment, there are two feedback modes: a first mode in which both an audio feedback and a visual feedback are provided to the user when the device that has been connected to the image display device is detected through the user application program; and a second mode in which only a visual feedback is provided to the user when the device that has been connected to the image display device is not detected.

Figure 4:
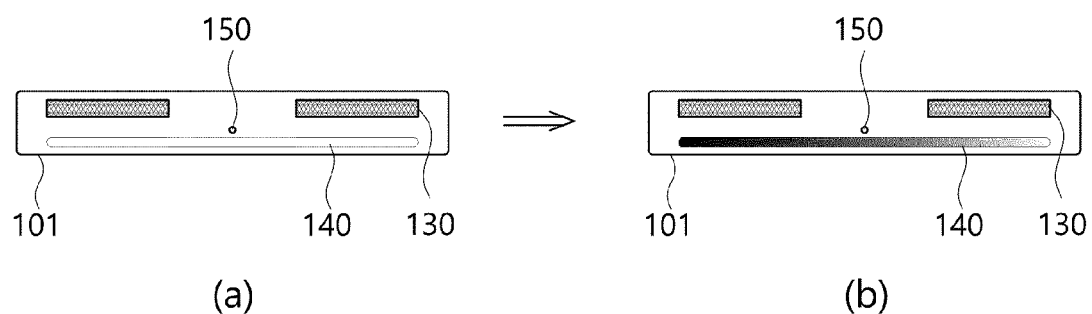
FIGS. 4 and 5 are schematic views illustrating a welcome feedback mode of the image display device 100 according to one exemplary embodiment of the present invention.
Figure 5:
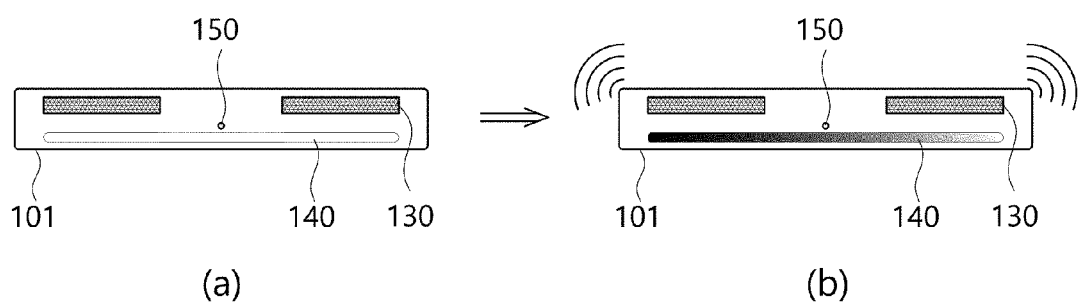

FIGS. 4 and 5 are schematic views illustrating welcome feedback modes of the image display device 100 according to one exemplary embodiment of the present invention.

FIG. 4 illustrates a case in which only the visual welcome feedback is provided through the light emitting unit 130. While the image display device 100 is in the zero view state, the light emitting unit 130 remains inactive as illustrated in FIG. 4A. However, when a user motion is detected, the light emitting unit 130 is toggled from the left to the right (i.e., activated), thereby providing the visual welcome feedback as illustrated in FIG. 4B.

FIG. 5 illustrates a case in which both the visual feedback and the audio feedback are provided through the light emitting unit 130 and the audio output unit 140. While the image display device 100 is in the zero view state, the light emitting unit 130 and the audio output unit 140 remain inactive. Only when a user motion is detected, the light emitting unit 130 is toggled from the left to the right to provide the visual welcome feedback and the audio output unit 140 is activated to provide the audio welcome feedback, for example, a bell sound of 'Tirori' as shown in FIG. 5B.

When the welcome feedback is provided once, the controller 170 disables the image capturing unit 150 and the motion detection unit 160 for a predetermined period of time or prevents another welcome feedback from being provided for a predetermined period of time even though a motion of a user is detected within the predetermined period of time. For example, when a user motion is detected and a welcome feedback is thus provided, the image display device 100 disables the welcome feedback function for first 30 seconds such that another welcome feedback cannot be provided within this period of time regardless of the detection of another user motion and then enables the welcome feedback function after the first 30 seconds pass. That is, after the first 30 seconds pass, another welcome feedback can be provided according to the results of a motion detection performed by the motion detection unit.

On the other hand, when the display panel 110 is in the partial view state, the controller 170 activates the image capturing unit 150 and the motion detection unit 160 to detect whether there is a user motion. When a user motion is not detected by the motion detection unit 160 for a predetermined period of time, the controller controls the drive unit 120 to roll down the display panel 110 so that the display panel 110 is switched from the partial view state or the full view state to the zero view state. When the image display device 100 is switched to the zero view state, the power of the image display device 100 is preferably turned off. That is, since the controller detects a user motion in the partial view state of the display panel 110 and switches the display panel 110 to the zero view state and turns off the power, it is possible to reduce power consumption when the image display device 100 is not used.

The image display device 100 according to an exemplary embodiment of the present invention may further include the image capturing unit 150 and a user-input interface unit 180.

The image capturing unit 150 receives and processes a broadcast signal, or an image signal output from an external device such as a set-top box, a game console, a computer, and the like. The image capturing unit 150 may include a tuner (not illustrated) for processing the broadcast signal and an external device interface unit (not illustrated) for connection with an external device. The image signal received by the image capturing unit 150 is transmitted to the display panel 110 under control of the controller 170 and displayed on the screen of the display panel 110.

The user-input interface unit 180 transmits a signal (hereinafter, simply referred to as user input) input by a user to the controller 170 or transmits a signal output from the controller 170 to a user. The user-input interface unit may include a module for communication with a remote control to receive the user input.

A control method of the image display device 100 according to an exemplary embodiment of the present invention will be described in detail with reference to FIGS. 5 and 6.

Figure 6:
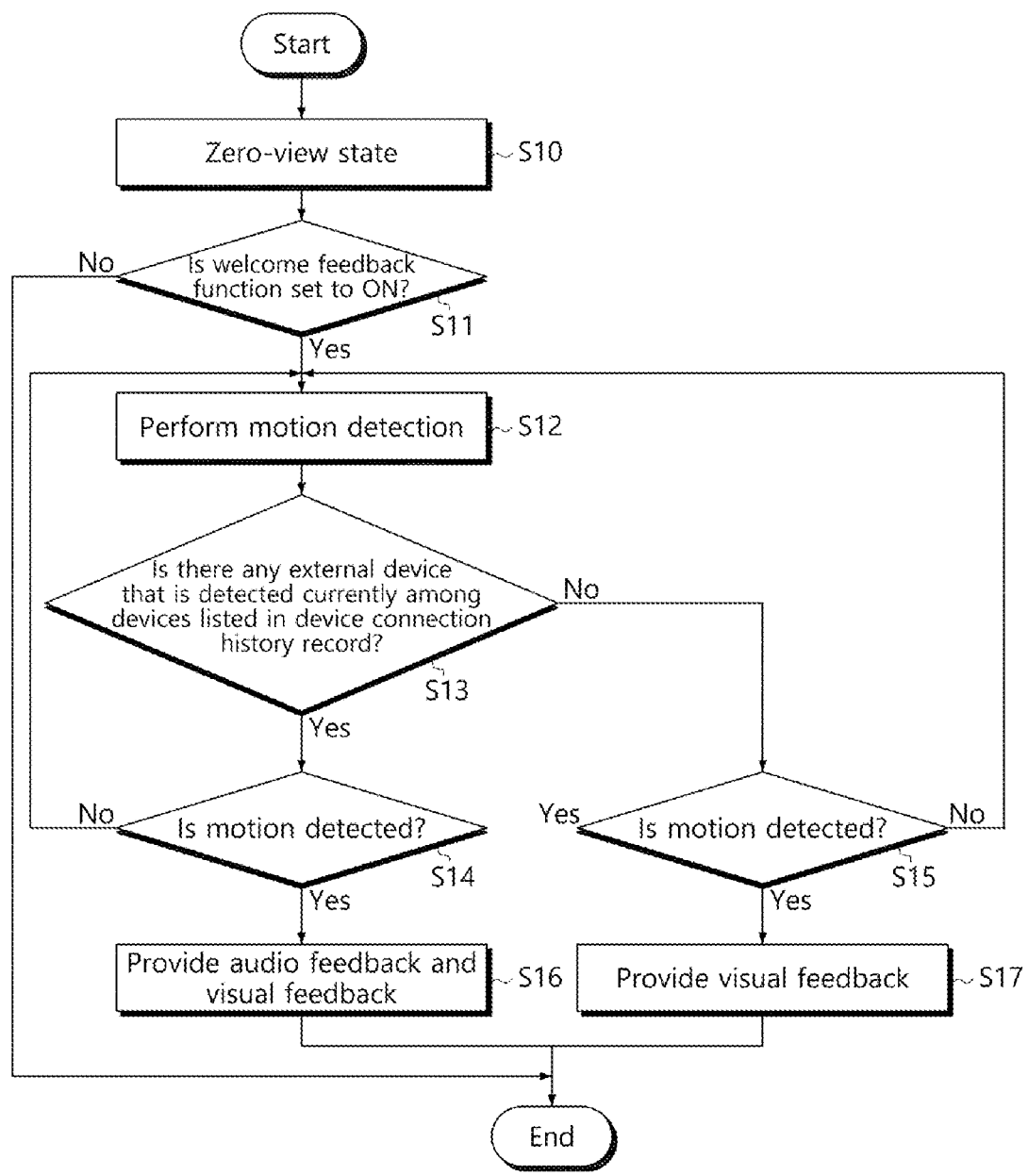
FIG. 6 is a view illustrating a control flow when a welcome feedback signal is provided according to the results of a motion detection in the image display device 100 according to one exemplary embodiment of the present invention._

FIG. 6 is a control flow in which a welcome feedback is provided according to a motion detection in the image display device 100 according to one exemplary embodiment of the present invention.

When a display panel 110 is in a zero-view state (S10), a controller 170 checks whether a welcome feedback function is set to ON state (S11). When it is determined that the welcome feedback function is set to ON state, the controller 170 activates am image capturing unit 150 and a motion detection unit 160 so that a user motion can be detected (S12).

The controller 170 checks whether a device that is listed in a connection history record in a user application program is detected (S13), and selects one of the welcome feedback modes according to the results of the checking.

When a user motion is detected (S14) after the device listed in the connection history record in the user application program is detected (S13), the controller 170 activates an audio output unit 140 and a light emitting unit 130 so that both of the visual feedback and the audio feedback can be provided through the light emitting unit 130 and the audio output unit 140, respectively (S16). In this case, the number of times that the welcome feedback is provided may be limited to less than a predetermined value in order to prevent a device operation error attributable to frequent connections with and disconnections from the device from occurring. For example, the welcome feedback mode in which both the audio feedback and the visual feedback are provided at the same time can be performed at most twice a day. After the welcome feedback mode in which both of the visual feedback and the audio feedback are provided at the same time is performed twice a day, the controller 170 may activate the welcome feedback mode in which only the visual feedback is provided through the light emitting unit 130 when a user motion is detected.

On the other hand, when a user motion is detected in a state in which none of the devices which are listed in the connection history record in the user application program is detected (S13), the controller 170 activates only the light emitting unit 130 to provide only the visual feedback (S17).

Figure 7:
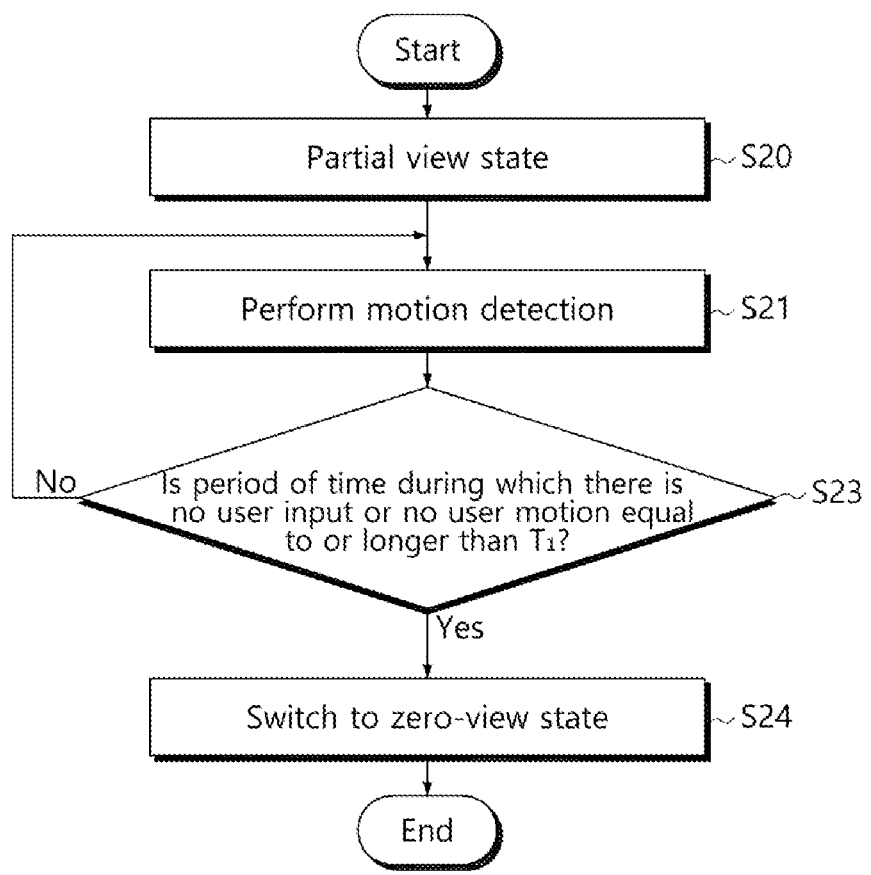
FIG. 7 is a view illustrating a control flow when a display panel is switched from a partial view state to a zero-view state according to the results of a motion detection in the image display device 100 according to one exemplary embodiment of the present invention.

FIG. 7 is a view illustrating a control flow for a case in which a display panel is switched from a partial view state to a zero-view state according to the results of a motion detection in the image display device 100 according to one exemplary embodiment of the present invention.

A controller 170 activates an image capturing unit 150 and a motion detection unit 160 to detect a user motion (S21) in the partial view state in which a display panel 110 is partially rolled up (S20). When there is no user motion or no user input through a user-input interface unit 180 for a predetermined period of time $T_1$ (S23), the controller controls the display panel 110 to roll the display panel 110 down so that the display panel 110 is switched to the zero view state from the partial view state (S24). The predetermined period of time $T_1$ may vary within a range of 3 hours to 5 hours. In this case, the controller 170 may control the image display device 100 to enter a standby mode (power saving mode).

On the other hand, when there is no user motion or no user input through the user-input interface unit 180 for the predetermined period of time $T_1$, the controller 170 may notify the user that the display panel 110 is switched to the zero view state by displaying a notification message indicating state switching instead of directly switching the display panel 110 to the zero view state. In this case, the user can input a key input to interrupt the state transition.

Figure 8:
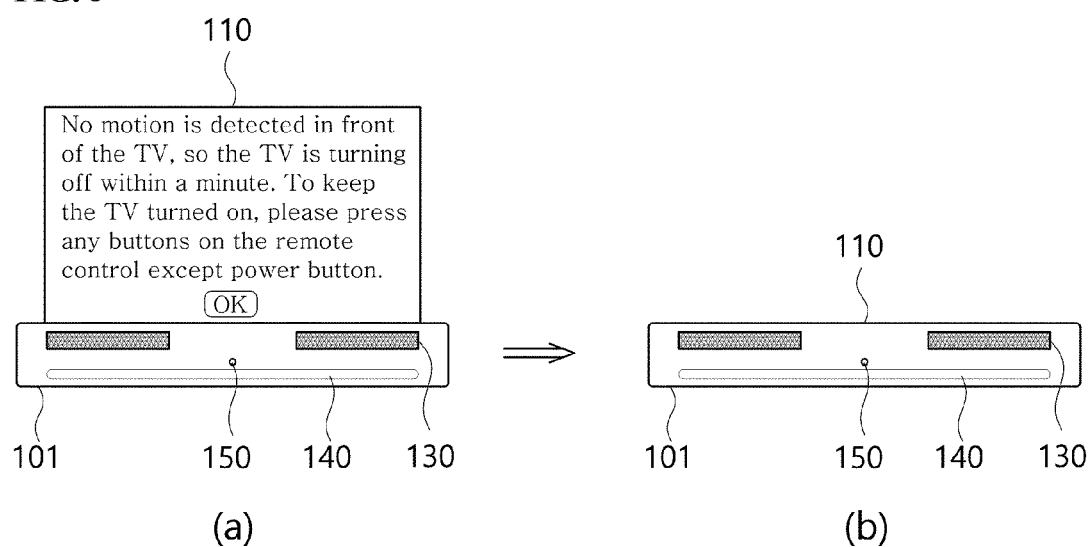
FIG. 8 is a schematic view illustrating a control flow when the display panel is switched from the partial view state to the zero-view state according to the results of a motion detection in the image display device 100 according to one exemplary embodiment of the present invention.

FIG. 8 schematically illustrates a transition from the partial view state to the zero view state in the image display device 100 according to an exemplary embodiment of the present invention. When there is no user motion or no user input for the predetermined period of time $T_1$, the controller 170 performs control such that the notification message is displayed on the screen of the display panel 110 of the image display device 100 as illustrated in FIG. 8A. After that, when there is no user input for a predetermined period of time $T_2$, the controller may perform control such that the display panel 110 is switched to the zero view state as illustrated in FIG. 8B. Here, the predetermined period of time $T_2$ may vary, for example, in a range of 1 minute to 3 minutes.

Hereinafter, the motion detection unit 160 and the motion detection method of the image display device 100 according to exemplary embodiments of the present invention will be described with reference to FIGS. 9 to 11.

Figure 9:
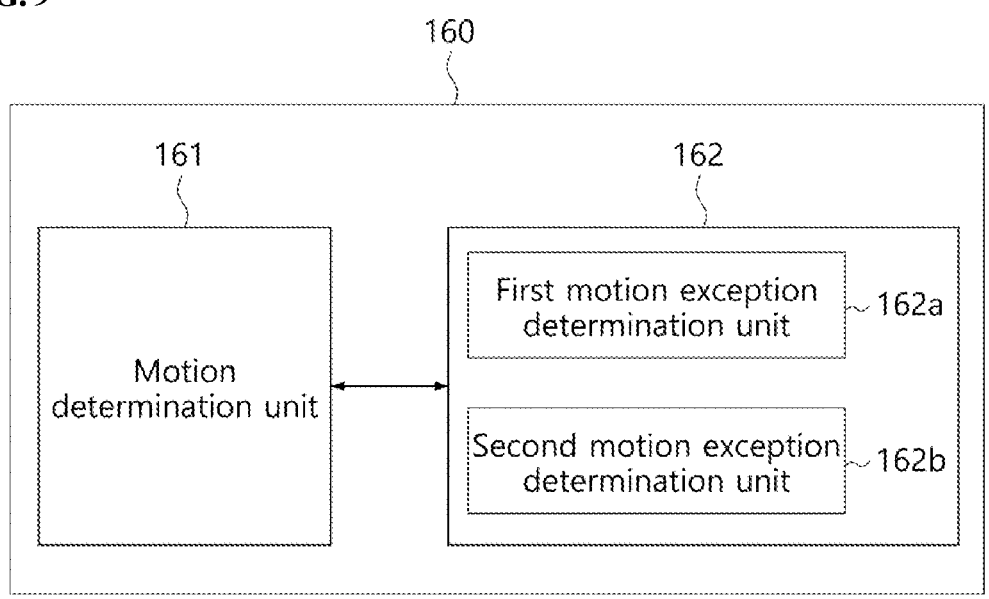
FIG. 9 is a block diagram of a motion detection unit 160 of the image display device 100 according to one exemplary embodiment of the present invention.

FIG. 9 is a block diagram of a motion detection unit 160 of the image display device 100 according to one exemplary embodiment of the present invention. Referring to FIG. 9, the motion detection unit 160 of the image display device 100 according to one exemplary embodiment of the present invention includes a motion determination unit 161 and a motion exception determination unit 162.

The motion determination unit 161 primarily analyzes image frames photographed by the image capturing unit 150 to determine whether there is a user motion. The motion determination unit 161 may use various motion detection techniques, such as histogram analysis, which performs analysis by accumulating changes for each block between the image frames.

The motion determination unit 161 divides each of the input frames into a plurality of blocks, and determines whether there is a user motion on the basis of a change (i.e., difference) in pixel brightness of each block between the image frames that are consecutively input.

For example, when 12 image frames per second are input through the image capturing unit 150 and each of the image frames is composed of 160*120 pixels, the motion determination unit 161 divides each image frame into 32*24 blocks each being composed of 5*5 pixels, and calculates the average of the brightness values of the pixels within each block.

For example, assuming that an interest block is defined as a block disposed at a certain position in an image frame and a corresponding block is defined as a block positioned at the same position in another image frame (i.e., the subsequent image frame), when a change in pixel brightness value (i.e., change in the average of the brightness values of the respective pixels) between the interest block and the corresponding block is equal to or greater than a predetermined threshold value $Th_1$, the motion determination unit 161 determines the interest block as a motion block. Hereinafter, a block that does not satisfy the requirements to be the motion block will be referred to as a motionless block. When the number of the motion blocks in an image frame is n or more, the motion determination unit 161 determines that there is a user motion (i.e., user motion has occurred).

According to another exemplary embodiment, when an event in which the change in the pixel brightness value (i.e., the average of the brightness values of the pixels) is equal to or greater than the predetermined threshold value $Th_1$ occurs consecutively m or more times, it is determined that the block may be determined as a motion block. For example, only when there are m or more consecutive image frames among which the change in the pixel brightness value between the blocks disposed at the same position respectively in the two consecutive image frames is equal to or greater than the predetermined threshold value $Th_1$, the blocks are determined as motion blocks.

Here, the number n and the number m are variable values that can be arbitrary set. The sensitivity of the motion detection can be adjusted according to the values of the numbers n and m. The greater the values of the numbers n and m, the higher the sensitivity. When the number n is set to be within a range of 1 to 3 and the number m is set to be within a range of 2 to 4, it is confirmed that the performance of the motion detection is improved.

On the other hand, the predetermined threshold value $Th_1$ may vary from block to block and may be set according to Equation 1.

$$Th_1 = A + [A-B] + C \quad \text{[Equation 1]}$$

In Equation 1, A is the overall average of the pixel brightness value differences each of which is a change in pixel brightness value between corresponding blocks in respective two consecutive image frames, B is the minimum value of the pixel brightness value differences, and C represents white or the weight of the brightness of the block.

In Equation 1, the values A and B vary according the brightness value of each frame or each block, and the predetermined threshold value $Th_1$ varies from frame to frame or from block to block.

The motion exception determination unit 162 functions to handle a motion exception event. That is, the motion exception determination unit 162 determines a sudden change in illuminance or a movement of a periodically moving object as an exception of motion. The motion exception determination unit 162 determines whether there occurs a motion exception event on the basis of at least one of the overall change and a local change in the pixel brightness value between two consecutive image frames.

The motion exception determination unit 162 includes a first motion exception determination unit 162a for determining a sudden change in illuminance caused by light from a vehicle or any external device as an exception of motion. The first motion exception determination unit 162a determines the case where a change in the average pixel brightness value between two consecutive image frames is equal to or greater than a predetermined threshold value $Th_2$ as a motion exception event. That is, the case is not determined as an event in which a user motion has occurred. That is, when the difference in the average pixel brightness value between two consecutive image frames is greater than or equal to the predetermined threshold value $Th_2$, the case is determined to be an event in which the illuminance has suddenly changed and is thus excluded from detection of a user motion.

Here, the predetermined threshold value $Th_2$ may be set to one value in a range of 1 to 64. As the value of the predetermined threshold value $Th_2$ is increased, the difference value that can be regarded as a motion exception condition attributable to a sudden change in the illuminance is increased. Therefore, the larger the predetermined threshold value $Th_2$, the sensitivity for detection of a motion exception event is lowered. The predetermined threshold value $Th_2$ may be appropriately set while considering the influence of the illuminance of the space in the image display device 100 is installed. When the predetermined threshold value $Th_2$ is set to a value within a range of 2 to 5, it is confirmed that it is possible to more easily detect a motion exception event attributable to a sudden change in the illuminance.

The motion exception determination unit 162 may include a second motion exception determination unit 162b to determine the case where the changes in the average pixel brightness value between every two consecutive image frames among a plurality of image frames sequentially input are periodic, as an exception of motion (i.e., motion exception event) attributable to periodic movements of an object. The second motion exception determination unit 162b detects movements of a periodically moving object (for example, a fan, a clock, or a moving accessory) disposed around the image display device 100 and determines the movement as an exception of motion (i.e., motion exception event).

The motion detection unit 160 further includes a register for storing the results of detection of periodic movements for each of the plurality of blocks. For example, when an image frame is divided into 32*24 blocks, registers corresponding to as many as the number of the blocks are provided.

The second motion exception determination unit 162b adds a value of p to the pixel brightness value of each of the motion blocks and stores the sum in a corresponding one of the registers. On the other hand, for each of the motionless blocks, a value of q is added and then the sum is stored in a corresponding one of the registers. When the value stored in a certain register reaches or exceeds a predetermined threshold value Th3, the block corresponding to the register is regarded as a motionless block and treated as an exception of motion when detecting a user motion.

In the case of blocks corresponding to periodic movements, the brightness values of the blocks in the respective frames show periodicity. In order to detect the blocks corresponding to periodic movements, the weight of p and the weight of q are applied to each of the blocks determined to be motion blocks and each of the blocks determined to be motionless blocks, respectively. The periodic movement is detected on the basis of the cumulative sum of the values for each block. On the case of periodic movements, it is often determined that there is a motion. Therefore, the value of p is set to be considerably greater than the value of q to detect the periodic movement. When the value of p is set to a value within a range of 9 to 12, the value of q is set to a value within a range of −3 to 0, and the predetermined threshold value $Th_3$ is set to a value within a range of 140 to 160, it was confirmed that the periodic movement of an object can be detected with good precision.

As described above, when the image display device 100 according to the present invention detects a user motion, if a change in illuminance attributable to a movement of an object (not a human) or a vehicle light beam is detected, it is not determined as a user motion but processed as a motion exception event. That is, such as a case is excluded from motion detection, thereby preventing erroneous motion detection.

Figure 10:
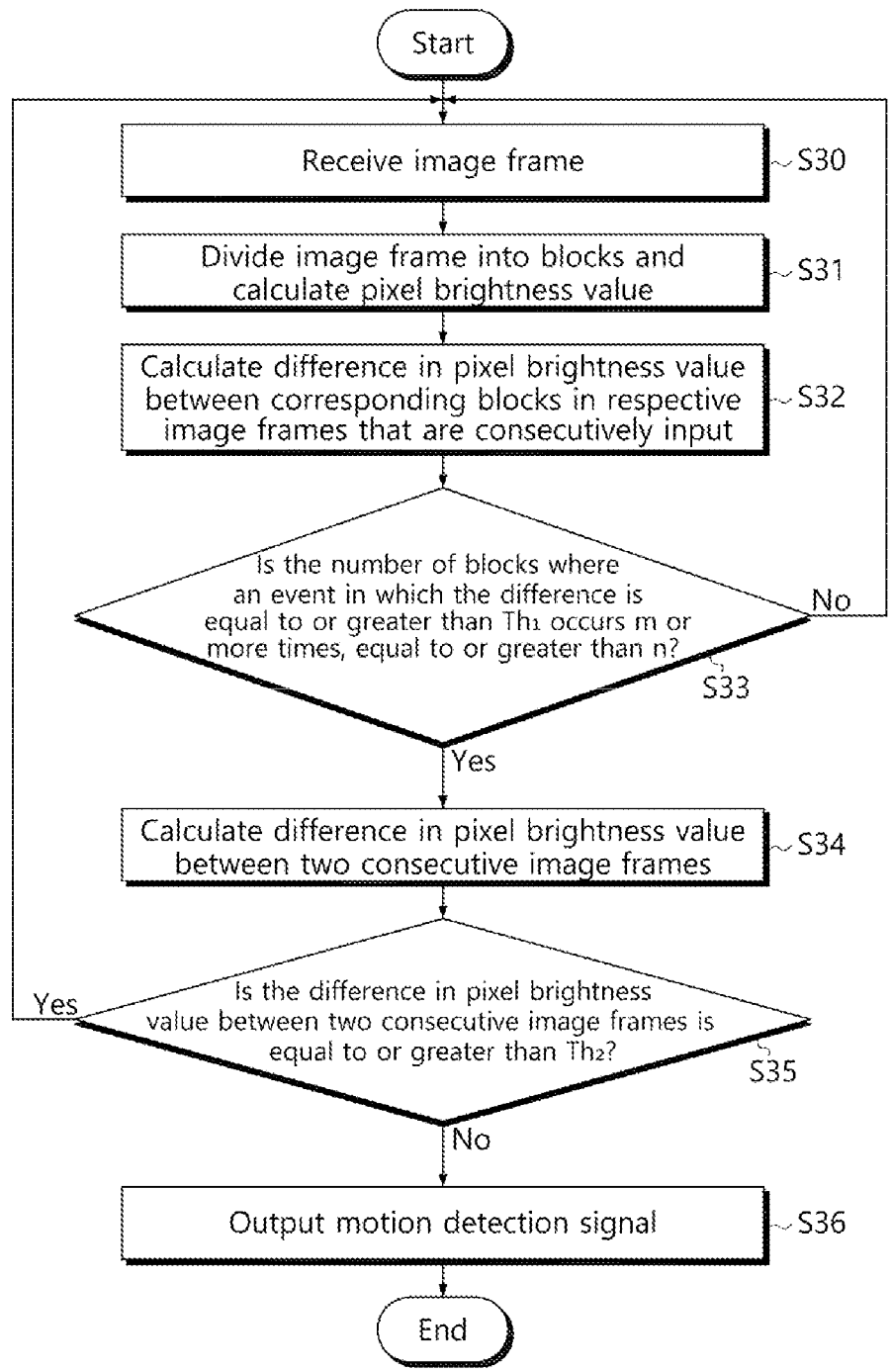
FIG. 10 is a flowchart illustrating a motion detection method of the image display device 100 according to one exemplary embodiment of the present invention.

FIG. 10 is a flowchart illustrating a motion detection method of the image display device 100 according to one exemplary embodiment of the present invention.

The motion detection unit 160 sequentially receives image frames captured by an image capturing unit 150 (S40). In this step, 12 image frames are input per second. The motion detection unit 160 divides each of the image frames into a plurality of blocks and calculates an average value of brightness values of respective pixels in each of the blocks (S41).

Then, the difference in average pixel brightness value between corresponding blocks within respective two consecutive image frames is calculated (S42). Next, it is determined whether the difference in average pixel brightness value between the corresponding blocks within the respective two consecutive image frames is equal to or greater than a predetermined threshold value $Th_1$. When an event in which the difference is equal to or greater than the predetermined threshold value $Th_1$ occurs m or more times (i.e., over m or more consecutive image frames), the blocks are determined as motion blocks. Next, it is determined whether the number of the motion blocks is n or more (S33).

When the number of the motion blocks is n or more, it is determined that there is a motion of a user. When the number of the motion blocks is less than n, it is determined that there is no motion of a user.

When the number of the motion blocks is n or more, the difference in the overall pixel brightness value between each of the consecutive image frames is calculated (S34). When the difference in the overall pixel brightness value between one image frame and the subsequent image frame is equal to or greater than a predetermined threshold value $Th_2$, this case is determined as an exception of motion and is excluded from detection of a user motion (S35). This corresponds to the function of the first motion exception processing unit. When the difference in the overall pixel brightness value between two consecutive image frames is equal to or greater than the predetermined threshold value $Th_2$, this case is determined that there is a sudden change in illumination and is thus excluded from detection of a user motion (i.e., the case is determined as a motion exception event).

On the other hand, when the difference in the overall pixel brightness value between two consecutive image frames is less than the predetermined threshold value $Th_2$, this case is determined that there is a user motion. In this case, a motion detection signal is output (S36).

Figure 11:
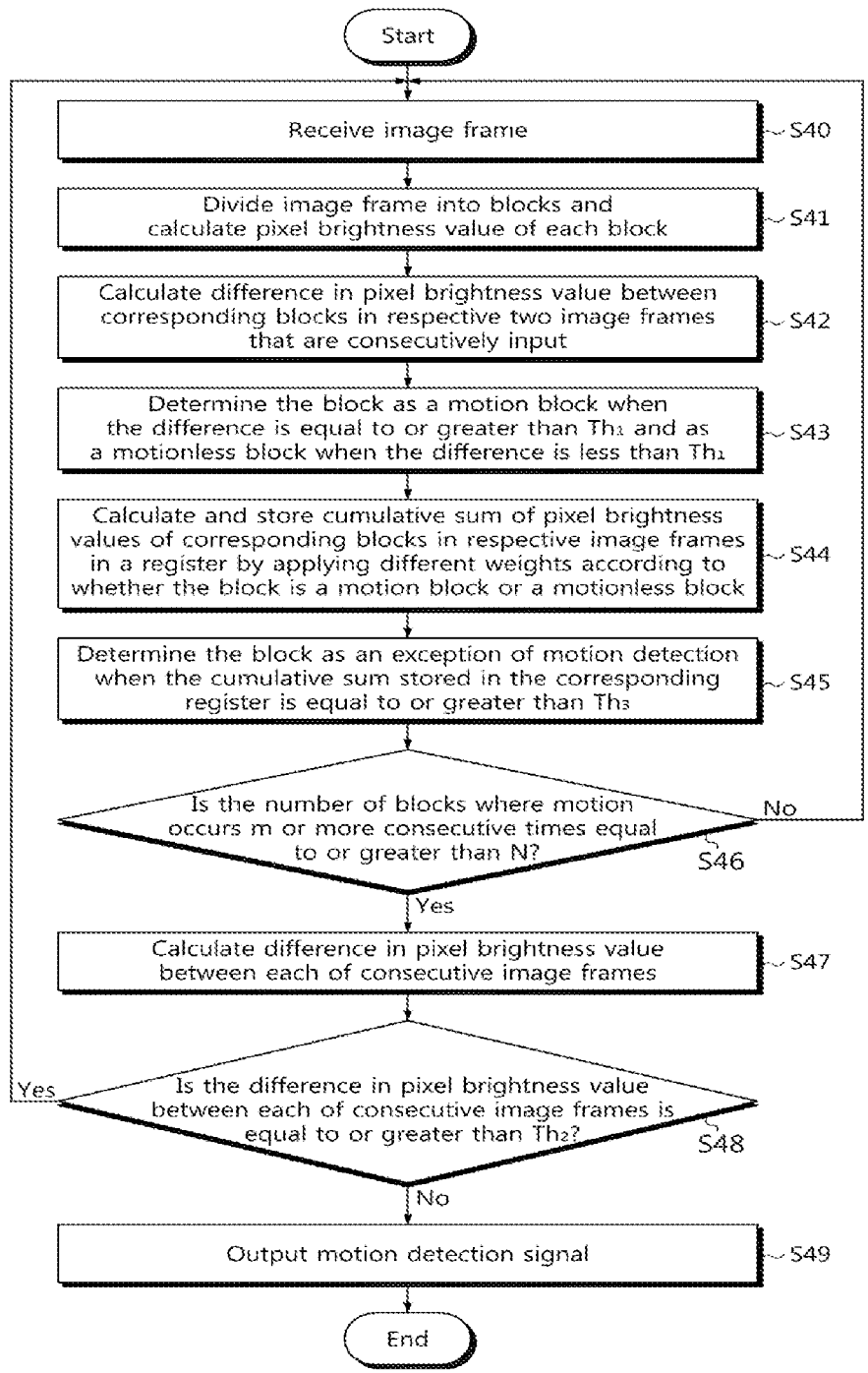
FIG. 11 is a flowchart illustrating a motion detection method of the image display device 100 according to one exemplary embodiment of the present invention.

FIG. 11 is a flowchart illustrating a motion detection method of the image display device 100 according to one exemplary embodiment of the present invention.

The motion detection unit 160 receives image frames captured by the image capturing unit 150 (S40), divides each of the image frames into a plurality of blocks, and calculates a pixel brightness value of each block (S41). Here, the pixel brightness value of each block means the average of the brightness values of all the pixels in each block.

The difference in the pixel brightness value of each block (i.e., the average of the brightness values of all the pixels in each block) between each of the consecutive image frames is calculated (S42). When the difference is less than a predetermined threshold value $Th_1$, the block is determined to be a motion block. A block that is not a motion block is referred to as a motionless block for sake of convenient description). The predetermined threshold value $Th_1$ may vary from block to block or frame to frame. The predetermined threshold value $Th_1$ may be determined according to Equation 1.

The motion detection unit 160 applies different weights to the motion blocks and the motionless blocks, respectively, and the cumulative sum of the pixel brightness values of each block is stored in a corresponding one of the registers. For example, a value of p is added to the value stored in a register corresponding to a motion block, and a value of q is added to the value stored in a register corresponding to a motionless block (S44).

When the cumulative sum stored in a resistor corresponding to a certain block is equal to or greater than a predetermined threshold $Th_3$, the block is determined as an exception of motion and is determined to be a motionless block (S45). This process corresponds to the function of the second motion exception processing unit described above. When a certain movement is periodically detected, this movement is regarded as a periodic motion of an object. In this case, the motion is determined as an exception of motion.

On the other hand, it is determined whether the number of blocks each of which is determined to be a motion block m or more consecutive times is n or more in each frame (S46). When the number is less than n, it is determined that there is no motion of a user in a corresponding one of the frames.

In Step S46, when it is determined that there is a motion of a user, a difference in overall pixel brightness value (i.e., the average of brightness values of all the pixels in one image frame) between the image frame and the subsequent image frame is calculated (S47). When the difference in the overall pixel brightness value between the image frame and the subsequent image frame is equal to or greater than a predetermined threshold value $Th_2$ (S48), it is determined that there is no motion of a user. That is, this case is determined as an exception of motion detection. On the contrary, when the difference is less than the predetermined threshold value $Th_2$ (S48), it is determined that there is a motion of a user, and a motion detection signal is output (S49).

As described above, according to the present invention, in order to reduce the power consumption of the image display device 100, a motion of a user existing in front of the image display device 100 is detected, and then a welcome feedback is provided to the user or the image display device is switched to the zero view state. In addition, during detection of a motion of a user, motion exception events in which a change in pixel brightness value attributable to a sudden change in illuminance or a periodic movement of an object is regarded as an exception of motion detection are determined. This has an advantage of preventing unexpected activation of the image display device.

On the other hand, the operation method of the image display device 100 according to the present invention may be implemented in the form of a code that is stored in a processor-readable recording medium provided in the image display device 100. Examples of the processor-readable recording medium include all kinds of recording devices that can store data that can be read by a processor. Specific examples of the processor-readable recording medium include a ROM, a RAM, a CD-ROM, a magnetic tape, a floppy disk, an optical data storage device, and the like. The processor-readable recording medium may be implemented in the form of a carrier wave for transmission of a signal over the Internet. The processor-readable recording medium may also be distributed over computer systems connected via a network, and the code may be stored and executed in the distributed processor-readable recording medium.

Although the exemplary embodiments of the present invention have been described for illustrative purposes, those skilled in the art will appreciate that various modifications, additions, and substitutions are possible, without departing from the scope and spirit of the present invention as defined in the appended claims. It is thus well known to those skilled in the art that the present invention is not limited to the exemplary embodiments disclosed in the detailed description but rather cover various modifications, additions, substitutions, and equivalents to the exemplary embodiments.

What is claimed is:

1. An image display device comprising:
    a rollable display panel;
    a motor configured to roll up or down the rollable display panel;
    a housing having an internal space to accommodate the rollable display panel;
    an image sensor configured to capture an image;
    a motion detector configured to detect motion by analyzing image frames captured by the image sensor; and
    a controller configured to control the motor to roll down the rollable display panel for switching the rollable display panel from a partial view state to a zero view state based on a determination that motion is not detected by the motion detector for a predetermined period of time while the rollable display panel is in the partial view state,
    wherein in the zero view state, the rollable display panel is rolled down into the housing, and
    wherein in the partial view state, the rollable display panel is partially rolled up.

2. The image display device of claim 1, wherein the motion detector further comprises a motion determinator configured to:
    divide each of the image frames captured by the image sensor into a plurality of blocks,
    determine a change in pixel brightness value of each of the plurality of blocks across the image frames that are sequentially input, and
    determine whether there is a motion based on the determined change in pixel brightness values; and
    a motion detection exception determinator configured to determine whether there is a motion exception event that is not regarded as the motion based on an overall change and a local change in pixel brightness value between each of the image frames that are consecutively input.

3. The image display device of claim 1, further comprising:
    a user-input interface configured to receive a user input,
    wherein the controller is further configured to control the motor to roll down the rollable display panel for switching the rollable display panel from the partial view state to the zero view state based on a determination that no user input is received via the user-input interface for a predetermined period of time while the rollable display panel remains in the partial view state.

4. The image display device according to claim 3, wherein the controller is further configured to:
    cause a display of a message on the rollable display panel based on a determination that motion is not detected by the motion detector or that user input is not received by a user interface for a predetermined period of time T1 while the rollable display panel is in the partial view state, wherein the message corresponds to an alert that power for the image display device will enter the zero view state; and
    activate the motor to roll down the rollable display panel to switch the rollable display panel to the zero view state based on a determination that motion is not detected by the motion detector or user input is not received by the user interface for a predetermined period of time T2.

5. The image display device of claim 2, wherein the motion determinator is configured to:
    determine a difference in pixel brightness value between corresponding blocks within respective two consecutive image frames that are sequentially input; and
    determine whether the corresponding blocks are motion blocks based on the determined difference in pixel brightness value being equal to or greater than a first predetermined threshold value Th1, wherein the motion is determined based on a number of motion blocks in a certain frame being a threshold value n or more.

6. The image display device of claim 2, wherein the motion determinator is configured to:
    determine a difference in pixel brightness value between corresponding blocks within respective two consecutive image frames that are sequentially input, and
    determine whether the corresponding blocks are motion blocks based on the determined difference in pixel brightness value being equal to or greater than a first predetermined threshold value Th1 consecutively occurring m or more times, wherein the motion is determined based on a number of the motion blocks in a certain frame being n or more.

7. The image display device of claim 6, wherein the first predetermined threshold value Th1 varies from frame to frame or from block to block.

8. The image display device of claim 6, wherein the motion determinator includes a first motion exception determinator that determines a motion exception event where the difference in the pixel brightness value is greater than or equal to a second predetermined threshold value Th2.

9. The image display device of claim 6, wherein the motion determinator includes a second motion exception determinator that determines a motion exception event where periodicity is found in differences in pixel brightness value within respective two consecutive image frames.

10. The image display device according to claim 9, further comprising:
    a number of registers corresponding to a number of the plurality of blocks in one image frame of the plurality of image frames, wherein each register is used to store a result of detection of a periodic movement in a corresponding one of the plurality of blocks,
    wherein the second motion exception determinator adds a value of p to a pixel value stored in each of the registers corresponding to the respective motion blocks and a value of q to a pixel value stored in each of the registers corresponding to respective motionless blocks and determines whether each block for which a cumulative value stored in a corresponding register is a motionless block based on the cumulative value being greater than or equal to a third predetermined threshold value Th3.

11. A method of controlling an image display device equipped with a processor, an image sensor that captures an image frame of an object exterior to the image display device, a rollable display panel, and a motor configured to roll up or down the rollable display panel, the method comprising:
    receiving the image frame captured by the image sensor;
    detecting motion by analyzing image frames captured by the image sensor
    controlling the motor to roll down the rollable display panel for switching the rollable display panel to a zero view state from a partial view state based on a determination that motion is not detected for a predetermined period of time while the rollable display panel is in the partial view state, wherein in the zero view state, the rollable display panel is rolled down into the housing, and wherein in the partial view state, the rollable display panel is partially rolled up.

12. The method according to claim 11, wherein the detecting motion comprises a step of:

dividing the image frames into a plurality of blocks and determining a pixel brightness value across each of the plurality of blocks, determining a difference in the pixel brightness value between each block of the plurality of the blocks in the image frame and a corresponding block of the plurality of the blocks in a subsequent image frame, determining whether there is a motion based on the determination the difference in the pixel brightness value, and determining whether there is a motion exception event that is not regarded as the motion based on an overall change and a local change in pixel brightness value between each of the image frames that are consecutively input.

13. The method according to claim 11, further comprising:

determining whether a user input is received via a user-input interface; and controlling the motor to roll down the rollable display panel such that the rollable display panel is switched from the partial view state to the zero view state based on a determination that no user input is received via the user-input interface for a predetermined period of time while the rollable display panel remains in the partial view state.

14. The method according to claim 13, further comprising:

causing a display of a message on the rollable display panel based on a determination that motion is not detected or that user input is not received by the user interface for a predetermined period of time T1 while the rollable display panel is in the partial view state, wherein the message corresponds to an alert that power for the image display device will enter the zero view state; and activating the motor to roll down the rollable display panel to switch the rollable display panel to the zero view state based on a determination that motion is not detected or user input is not received by the user interface for a predetermined period of time T2.

15. The method according to claim 12, wherein the detecting motion comprises a step of:

determining a difference in pixel brightness value between corresponding blocks within respective two consecutive image frames that are sequentially input; and determining whether the corresponding blocks are motion blocks based on the determined difference in pixel brightness value being equal to or greater than a first predetermined threshold value Th1 consecutively occurring m or more times, wherein the motion is determined based on a number of the motion blocks in a certain frame being n or more.

16. The method according to claim 12, wherein the detecting motion comprises a step of:

determining a difference in pixel brightness value between corresponding blocks within respective two consecutive image frames that are sequentially input, and determining whether the corresponding blocks are motion blocks based on the determined difference in pixel brightness value being equal to or greater than a first predetermined threshold value Th1 consecutively occurring m or more times, wherein the motion is determined based on a number of the motion blocks in a certain frame being n or more.

17. The method according to claim 16, wherein the first predetermined threshold value Th1 varies from frame to frame or from block to block.

18. The method according to claim 16, wherein the determining whether there is a motion exception event comprises a step of:

determining a motion exception event where the difference in the pixel brightness value is greater than or equal to a second predetermined threshold value Th2.

19. The method according to claim 16, wherein the determining whether there is a motion exception event comprises a step of:

determining a motion exception event where periodicity is found in differences in pixel brightness value within respective two consecutive image frames.

20. The method according to claim 19, wherein the image display device comprises a number of registers corresponding to a number of the plurality of blocks in one image frame of the plurality of image frames, wherein each register is used to store a result of detection of a periodic movement in a corresponding one of the plurality of blocks, and wherein the method further comprising: adding a value of p to a pixel value stored in each of the registers corresponding to the respective motion blocks and a value of q to a pixel value stored in each of the registers corresponding to respective motionless blocks and determines whether each block for which a cumulative value stored in a corresponding register is a motionless block based on the cumulative value being greater than or equal to a third predetermined threshold value Th3.

* * * * *